(12) United States Patent
Vasant Akole et al.

(10) Patent No.: US 9,256,876 B2
(45) Date of Patent: Feb. 9, 2016

(54) REAL-TIME SPEND MANAGEMENT WITH SAVINGS GOALS

(71) Applicant: FMR LLC, Boston, MA (US)

(72) Inventors: Ninad Vasant Akole, Karnataka (IN); Jayesh Rajagopalan Chakravarthi, Karnataka (IN); Prasad Murari Hebbar, Karnataka (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 14/171,189

(22) Filed: Feb. 3, 2014

(65) Prior Publication Data

US 2015/0220923 A1    Aug. 6, 2015

(51) Int. Cl.
*G06Q 40/00* (2012.01)
*G06Q 20/40* (2012.01)

(52) U.S. Cl.
CPC .................................. *G06Q 20/405* (2013.01)

(58) Field of Classification Search
CPC ....... G06Q 40/00; G06Q 20/00; G06Q 30/00; G06Q 10/00
USPC ....................................................... 705/3–44
See application file for complete search history.

(56) References Cited

U.S. PATENT DOCUMENTS

| | | | |
|---|---|---|---|
| 5,644,727 A | 7/1997 | Atkins | |
| 5,809,492 A | 9/1998 | Murray et al. | |
| 5,848,400 A | 12/1998 | Chang | |
| 7,117,172 B1 | 10/2006 | Black | |
| 7,248,855 B2 | 7/2007 | Joyce et al. | |
| 7,509,287 B2 | 3/2009 | Nutahara et al. | |
| 7,860,789 B2 | 12/2010 | Hirka et al. | |
| 8,036,984 B2 | 10/2011 | Elterich | |

(Continued)

FOREIGN PATENT DOCUMENTS

| | | |
|---|---|---|
| EP | 1 351 180 | 10/2003 |
| WO | WO 00/62224 | 10/2000 |

(Continued)

OTHER PUBLICATIONS

Feigenbaum, Randi, "Shining Light on Low-Cost Accounts," Newsday, 2011, 2 pages.

(Continued)

*Primary Examiner* — Frantzy Poinvil
(74) *Attorney, Agent, or Firm* — Fish & Richardson P.C.

(57) ABSTRACT

A computer-implemented method, including receiving, by one or more computer systems, a withdrawal request for withdrawal of funds from one or more financial accounts; determining, by the one or more computer systems, whether a discretionary balance of the one or more financial accounts is greater than or equal to an amount of the withdrawal request, with the discretionary balance being based on an amount of funds that are available in the one or more financial accounts and a portion of the available funds allocated to a savings goal; causing an approval of the withdrawal request when the discretionary balance is greater than or equal to the amount of the withdrawal request; and sending a real time notification to a client device of a user associated with the one or more financial accounts when the discretionary balance is less than the amount of the withdrawal request with a real time opportunity for the user to reduce funds allocated to savings goals if required and thereby increasing the discretionary balance to facilitate the approval of withdrawal request.

24 Claims, 10 Drawing Sheets

(56) References Cited

U.S. PATENT DOCUMENTS

| | | | |
|---|---|---|---|
| 8,069,113 B2 | 11/2011 | Elterich | |
| 8,121,943 B2 | 2/2012 | Elterich | |
| 8,595,083 B2* | 11/2013 | O'Leary et al. | 705/26.1 |
| 8,650,122 B2* | 2/2014 | Padalino et al. | 705/42 |
| 8,666,887 B2* | 3/2014 | Elterich | 705/39 |
| 8,694,425 B2* | 4/2014 | O'Leary et al. | 705/39 |
| 8,732,076 B2* | 5/2014 | Scipioni et al. | 705/39 |
| 8,738,521 B2* | 5/2014 | O'Leary et al. | 705/39 |
| 2002/0069077 A1 | 6/2002 | Brophy et al. | |
| 2002/0091635 A1 | 7/2002 | Dilip et al. | |
| 2002/0091637 A1 | 7/2002 | Bent et al. | |
| 2002/0174048 A1 | 11/2002 | Dheer et al. | |
| 2003/0023573 A1 | 1/2003 | Chan et al. | |
| 2003/0105711 A1 | 6/2003 | O'Neil | |
| 2003/0177079 A1 | 9/2003 | Krajewski et al. | |
| 2003/0229670 A1 | 12/2003 | Beyda | |
| 2004/0002910 A1 | 1/2004 | Mizukami | |
| 2004/0117407 A1 | 6/2004 | Kumar et al. | |
| 2004/0133876 A1 | 7/2004 | Sproule | |
| 2005/0182720 A1* | 8/2005 | Willard et al. | 705/40 |
| 2008/0228637 A1* | 9/2008 | Scipioni et al. | 705/39 |
| 2008/0275820 A1* | 11/2008 | Joao et al. | 705/44 |
| 2009/0287603 A1 | 11/2009 | Lamar, III et al. | |
| 2011/0238573 A1* | 9/2011 | Varadarajan | 705/43 |
| 2012/0310824 A1* | 12/2012 | Liberty | 705/40 |
| 2013/0060692 A1* | 3/2013 | Typrin et al. | 705/44 |
| 2013/0159191 A1* | 6/2013 | Maiya et al. | 705/44 |
| 2013/0317984 A1* | 11/2013 | O'Leary et al. | 705/40 |
| 2014/0143140 A1 | 5/2014 | Elterich | |

FOREIGN PATENT DOCUMENTS

| | | |
|---|---|---|
| WO | WO 01/99007 | 12/2001 |
| WO | WO 02/19229 | 3/2002 |

OTHER PUBLICATIONS

International Preliminary Report dated Nov. 8, 2005 for corresponding Application No. PCT/US2004/042511, pp. 1-7.
Yodlee Bill Direct Product, described at http://corporate.yodlee.com/solutions/personal_finance/billdirect/index.html May 16, 2008.
The Ultimate Personal Finance Solution product by Yodlee, Inc., described at http://corporate.yodlee.com/solutions/personal_finance/index.html May 16, 2008.
Yodlee Alerts product by Yodlee, Inc., described at http://corporate.yodlee.com/solutions/personal_finance/alerts/index.html May 16, 2008.
Yodlee Toolbar product by Yodlee, Inc., described at http://corporate.yodlee.com/solutions/personal_finance/toolbar.index.html May 16, 2008.
Advisor view product by Yodlee, Inc. described at http://corporate.yodlee.com/solutions/wealth_management/advisorview/index.html May 16, 2008.
Powering Wealth Management Applications by Yodlee, Inc., described at http://corporate.yodlee.com/solutions/wealth_management/index.html May 16, 2008.
Yodlee's iFinity Platform described at http://corporate.yodlee.com/technology/index.html May 16, 2008.
Aggregation's ROI by Yodlee, Inc. May 16, 2008.
Appeal Brief filed Jul. 29, 2011 in corresponding U.S. Appl. No. 10/739,597, pp. 1-27.
Notice of Appeal filed May 4, 2011 in corresponding U.S. Appl. No. 10/739,597, p. 1.
Final Office Action dated Feb. 4, 2011 in corresponding U.S. Appl. No. 10/739,597, pp. 1-17.
Response to Non-Final Office Action dated Aug. 19, 2010 in corresponding U.S. Appl. No. 10/739,597, filed Nov. 17, 2010, pp. 1-11.
Non-Final Office Action dated Aug. 19, 2010 in corresponding U.S. Appl. No. 10/739,597, pp. 1-17.
Response to Non-Final Office Action dated Feb. 5, 2010 in corresponding U.S. Appl. No. 10/739,597, filed Jun. 3, 2010, pp. 1-12.
Non-Final Office Action dated Feb. 5, 2010 in corresponding U.S. Appl. No. 10/739,597, pp. 1-16.
Response to Non-Final Office Action dated Aug. 31, 2009 in corresponding U.S. Appl. No. 10/739,597, filed Nov. 18, 2009, pp. 1-10.
Non-Final Office Action dated Aug. 31, 2009 in corresponding U.S. Appl. No. 10/739,597, pp. 1-11.
Response to Final Office Action dated Feb. 24, 2009 in corresponding U.S. Appl. No. 10/739,597, filed Jun. 2, 2009, pp. 1-16.
Final Office Action dated Feb. 24, 2009 in corresponding U.S. Appl. No. 10/739,597, pp. 1-14.
Response to Non-Final Office Action dated Sep. 26, 2008 in corresponding U.S. Appl. No. 10/739,597, filed Nov. 12, 2008, pp. 1-18.
Non-Final Office Action dated Sep. 26, 2008 in corresponding U.S. Appl. No. 10/739,597, pp. 1-13.
Response to Final Office Action dated Mar. 18, 2008 in corresponding U.S. Appl. No. 10/739,597, filed Jun. 24, 2008, pp. 1-12.
Final Office Action dated Mar. 18, 2008 in corresponding U.S. Appl. No. 10/739,597, pp. 1-15.
Response to Non-Final Office Action dated Aug. 20, 2007 in corresponding U.S. Appl. No. 10/739,597, filed Jan. 28, 2008, pp. 1-10.
Response to Non-Final Office Action dated Aug. 20, 2007 in corresponding U.S. Appl. No. 10/739,597, filed Oct. 15, 2007, pp. 1-11.
Non-Final Office Action dated Aug. 20, 2007 in corresponding U.S. Appl. No. 10/739,597, pp. 1-13.
Appeal Brief filed Apr. 5, 2011 in corresponding U.S. Appl. No. 12/254,373, pp. 1-30.
Non-Final Office Action dated Oct. 6, 2010 in corresponding U.S. Appl. No. 12/254,373, pp. 1-17.
Appeal Brief filed Jul. 8, 2010 in corresponding U.S. Appl. No. 12/254,373, pp. 1-30.
Final Office Action dated Jan. 11, 2010 in corresponding U.S. Appl. No. 12/254,373, pp. 1-17.
Response to Non-Final Office Action dated May 29, 2009 in corresponding U.S. Appl. No. 12/254,373, filed Sep. 16, 2009, pp. 1-13.
Non-Final Office Action dated May 29, 2009 in corresponding U.S. Appl. No. 12/254,373, pp. 1-13.
Response to Final Office Action dated Mar. 17, 2010 in corresponding U.S. Appl. No. 12/254,390, filed Oct. 30, 2013, pp. 1-11.
Response to Final Office Action dated Mar. 17, 2010 in corresponding U.S. Appl. No. 12/254,390, filed Nov. 8, 2011, pp. 1-10.
Appeal Brief filed Oct. 18, 2010 in corresponding U.S. Appl. No. 12/254,390, pp. 1-29.
Final Office Action dated Mar. 17, 2010 in corresponding U.S. Appl. No. 12/254,390, pp. 1-15.
Response to Non-Final Office Action dated Aug. 7, 2009 in corresponding U.S. Appl. No. 12/254,390, filed Nov. 6, 2009, pp. 1-10.
Non-Final Office Action dated Aug. 7, 2009 in corresponding U.S. Appl. No. 12/254,390, pp. 1-9.
Mohl, Bruce, "Consumer Beat" Boston Globe Newspaper, Jan. 5, 2003, 3 pages.
Response to Non-Final Office Action dated Oct. 19, 2011 in corresponding U.S. Appl. No. 12/254,475, filed Dec. 8, 2011, pp. 1-9.
Non-Final Office Action dated Oct. 19, 2011 in corresponding U.S. Appl. No. 12/254,475, pp. 1-7.
Appeal Brief filed Jul. 29, 2011 in corresponding U.S. Appl. No. 12/254,475, pp. 1-39.
Non-Final Office Action dated Feb. 2, 2011 in corresponding U.S. Appl. No. 12/254,475, pp. 1-22.
Appeal Brief filed Nov. 1, 2010 in corresponding U.S. Appl. No. 12/254,475, pp. 1-37.
Final Office Action dated Apr. 1, 2010 in corresponding U.S. Appl. No. 12/254,475, pp. 1-22.
Response to Non-Final Office Action dated Sep. 17, 2009 in corresponding U.S. Appl. No. 12/254,475, filed Dec. 9, 2009, pp. 1-18.
Non-Final Office Action dated Sep. 17, 2009 in corresponding U.S. Appl. No. 12/254,475, pp. 1-13.
Non-Final Office Action dated Mar. 27, 2014 in corresponding U.S. Appl. No. 14/164,558, pp. 1-14.

* cited by examiner

REAL-TIME SPEND MANAGEMENT WITH SAVINGS GOALS

BACKGROUND

An account balance is an amount of financial resources (e.g., funds) that are available in a financial account. There are various financial vehicles to promote savings by individuals, including, e.g., savings accounts, retirement accounts, and so forth. These financial vehicles that promote savings are often unsuccessful in helping individuals achieve their savings goals.

SUMMARY

In an implementation, a computer-implemented method includes receiving, by one or more computer systems, a withdrawal request for withdrawal of funds from one or more financial accounts; determining, by the one or more computer systems, whether a discretionary balance of the one or more financial accounts is greater than or equal to an amount of the withdrawal request, with the discretionary balance being based on an amount of funds that are available in the one or more financial accounts and a portion of the available funds allocated to savings goal(s); causing an approval of the withdrawal request when the discretionary balance is greater than or equal to the amount of the withdrawal request; and sending a notification to a client device of a user associated with the one or more financial accounts when the discretionary balance is less than the amount of the withdrawal request.

This implementation includes one or more of the following features and/or actions. The notification is a rejection of the withdrawal request. The notification is a notification of an insufficient discretionary balance for the withdrawal request. Determining the discretionary balance comprises: determining the discretionary balance as of today and a specified future date, with the discretionary balance being based on an available balance on a date of the withdrawal request, an amount of income that is expected to be credited to the one or more financial accounts by the specified future date, an amount for expenses that is expected to be debited from the one or more financial accounts by the specified future date and the portion of the available funds that allocated to the savings goals. The actions include receiving, from the client device associated with the user, information requesting approval of the withdrawal request when the discretionary balance is less than the amount of the withdrawal request; and causing an approval of the withdrawal request, when the available funds are greater than or equal to the amount of the withdrawal request. The actions include reducing the amount of the discretionary balance by the amount of the withdrawal request when the discretionary balance is greater than or equal to the amount of the withdrawal request. The actions include receiving, from the client device associated with the user, information indicative of an adjustment of the portion of the available funds that allocated to one or more savings goals, with the adjustment increasing an amount of discretionary balance, relative to the amount of discretionary balance prior to the adjustment when the discretionary balance is less than the amount of the withdrawal request; and causing an approval of the withdrawal request.

The actions include receiving savings goal information indicative of the savings goal and an amount of funds to be saved for the savings goal, time frequency of saving for the goal and amount of funds to be saved per time frequency, with the savings goal being associated with a target completion date; retrieving incoming fund information indicative of an amount of incoming funds that are expected to be deposited into the one or more financial accounts at one or more predetermined time intervals; allocating, by the one or more computing systems based on the savings goal information and a current balance of the one or more financial accounts, an amount of the incoming funds to the savings goal; and at one of the one or more predetermined time intervals, reducing the discretionary balance by the amount of funds allocated to the savings goal. The discretionary balance is the portion of the available funds that allocated to the savings goal subtracted from the amount of funds that are available in the one or more financial accounts.

All or part of the foregoing may be implemented as a computer program product including instructions that are stored on one or more non-transitory machine-readable storage media that are a hard drive, a random access memory storage device, such as a dynamic random access memory, machine-readable hardware storage devices, and other types of non-transitory machine-readable storage devices, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DETAILED DESCRIPTION

Figure 1:
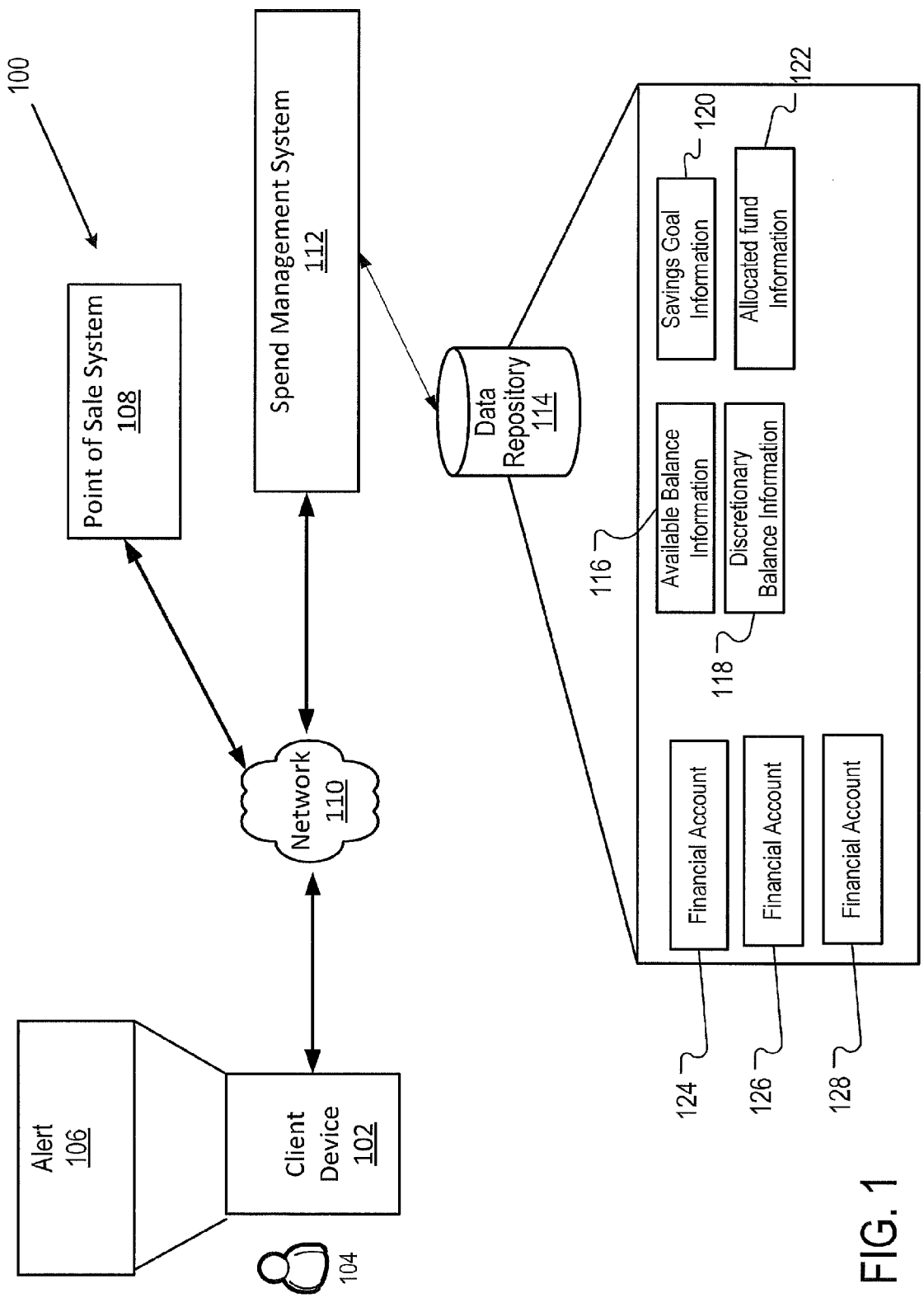
FIG. 1 is a diagram of a system for real-time spend management.

Referring to FIG. 1, system 100 includes client device 102, point of sale system 108, network 110, spend management system 112 and data repository 114. User 104 is associated with client device 102. Spend management system 112 is associated with one or more financial institutions (e.g., banks, brokerage firms, investment houses, and so forth). User 104 is associated with financial accounts 124, 126, 128, which are maintained by a financial institution associated with spend management system 112. Financial accounts 124, 126, 128 are associated with available balance information 116, e.g., information specifying an available balance in one or more of financial accounts 124, 126, 128. There are various types of financial resources that may be available in financial accounts 124, 126, 128. These types of financial resources include cash, as well as investment resources including securities, bonds, etc. and dividends, capital gains, interest and so forth.

User 104 has various savings goals. Exemplary savings goals can be for saving for a trip or saving for a purchase of goods or services. User 104 inputs into client device 102 savings goal information 120, e.g., information indicative of the various savings goals. Client device 102 transmits via network 110 savings goal information 120 to spend management system 112, which stores savings goal information 120 in data repository 114. Savings goal information 120 is shown in the below Table 1:

TABLE 1

| Savings Goal Name | Amount to be Saved | Completion Date | Frequency of Saving | Amount to be saved per time frequency |
|---|---|---|---|---|
| Vacation to Bali | $3000 | Jun. 15, 2014 | Monthly | $300 |

In this example, spend management system 112 determines an amount of financial resources to be allocated to the savings goal, e.g., at user defined intervals. Available balance information 116 is shown in Table 2 below:

TABLE 2

| Available Balance | Current Date |
|---|---|
| $6000 | Mar. 15, 2014 |

Spend management system 112 determines an amount of funds to allocate ("Goal Allocated Funds") to fulfill the savings goal based on one or more of the available balance and incoming funds and the amount to be saved. Spend management system 112 determines "Goal Allocated Funds," i.e., the amount of funds to be allocated to fulfillment of the savings goal in accordance with the equation shown in Table 3 below:

TABLE 3

Goal Allocated Funds = Amount to be Saved, when Available Balance > Amount to be Saved or when Incoming Funds > Amount to be Saved As shown in Table 3 above, the amount of allocated funds is equal to the amount of funds to be saved to meet the savings goal. Spend management system 112 stores in data repository 114 allocated fund information 122, e.g., information indicative of an amount of funds to be allocated to meet the savings goal. Using the current available balance and the amount of allocated funds, spend management system 112 determines a discretionary balance, e.g., an amount of funds that are available for discretionary spending. The discretionary balance includes an amount of funds that are currently available and that are not allocated to savings goals, in accordance with the equation in Table 4:

TABLE 4

Discretionary Balance = Available Balance − Goal Allocated Funds

As shown in the above Table 4, the discretionary balance is the amount of goal allocated funds subtracted from the available balance. Spend management system 112 computes the discretionary balance and saves in data repository 114 discretionary balance information 118.

In a variation, spend management system 112 determines the amount of goal allocated funds based on re-occurring incoming funds (e.g., monthly deposits) in the financial accounts and a current available balance. Financial accounts 124, 126, 128 receive incoming monthly deposits of $1000/month. The savings goal and the current available balance are as shown in Tables 3 and 4, respectively. Spend management system 112 determines an amount of time from a current date (e.g., Mar. 15, 2014) to the goal completion date (e.g., Jun. 15, 2014). In this example, the amount of time is three months. Spend management system 112 uses the amount of incoming monthly deposits in determining goal allocated funds, e.g., over predetermined time intervals. In this example, spend management system 112 allocates, each month, a specified amount of funds (e.g., one-thousand dollars) to the savings goal. In this example, the discretionary balance is six-thousand dollars per month (e.g., after the financial accounts have received the re-occurring monthly income). Spend management system 112 automatically determines an amount of funds to allocate to various savings goals, e.g., based on a current available balance and re-occurring incoming deposits. In a variation, user 104 can specify an amount of funds to be allocated to a savings goal (e.g., at specified time intervals).

Spend management system 112 also notifies user 104 when user 104 is initiating a transaction (e.g., purchasing a good) for an amount that exceeds the discretionary balance of financial accounts 124, 126, 128. User 104 uses a payment card (e.g., a debit card, a bank card, a credit card and so forth) at a merchant, e.g., by swiping the payment card through a point of sale system 108. Point of sale system 108 transmits to a financial institution associated with the payment card information about the transaction, including, e.g., an amount of the transaction. The financial institution detects that user 104 is enrolled in real-time spend management (e.g., implemented by spend management system 112) and transmits the information about the transaction to spend management system 112. Spend management system 112 can be operated by the financial institution or another entity.

The information about the transaction includes information that uniquely identifies user 104, including a user name, account numbers of financial accounts 124, 126, 128 and so forth. Using the information that uniquely identifies user 104, spend management system 112 determines that financial accounts 124, 126, 128 are associated with user 104 who is making the transaction at the point of sale system 108. Spend management system 112 compares the transaction amount to the discretionary balance of financial accounts 124, 126, 128, both current and future dated, with the future dated discretionary balance check to cover transactions such as credit card transactions that apply to financial accounts at a future date. When the discretionary balance is sufficient to cover the transaction amount (e.g., the discretionary balance is greater than or equal to the transaction amount), spend management system 112 allocates funds from the discretionary balance for the transaction and causes a notification of available funds to be sent to a credit or debit card processing network (or other card network). Subsequently, the credit or debit card processing network can approve the transaction subject to constraints imposed by the credit or debit card processing network.

When the discretionary balance is insufficient to cover the transaction amount (e.g., the discretionary balance is less than the transaction amount), spend management system 112 can perform one or several actions. For example, the spend management system 112 can send a notification to the user that the discretionary balance is insufficient or in some examples, the spend management system 112 can deny the transaction and cause a notification to be sent to a credit card processing network (or other card network) that the transaction is denied. Spend management system 112 also generates alert 106 and transmits alert 106 to client device 102. Alert 106 notifies user 104 that the discretionary balance in financial accounts 124, 126, 128 is insufficient to cover the transaction. Alert 106 also prompts user 104 to re-adjust and/or decrease savings goals, e.g., to increase an amount of discretionary balance that is available for the transaction.

Figure 2:
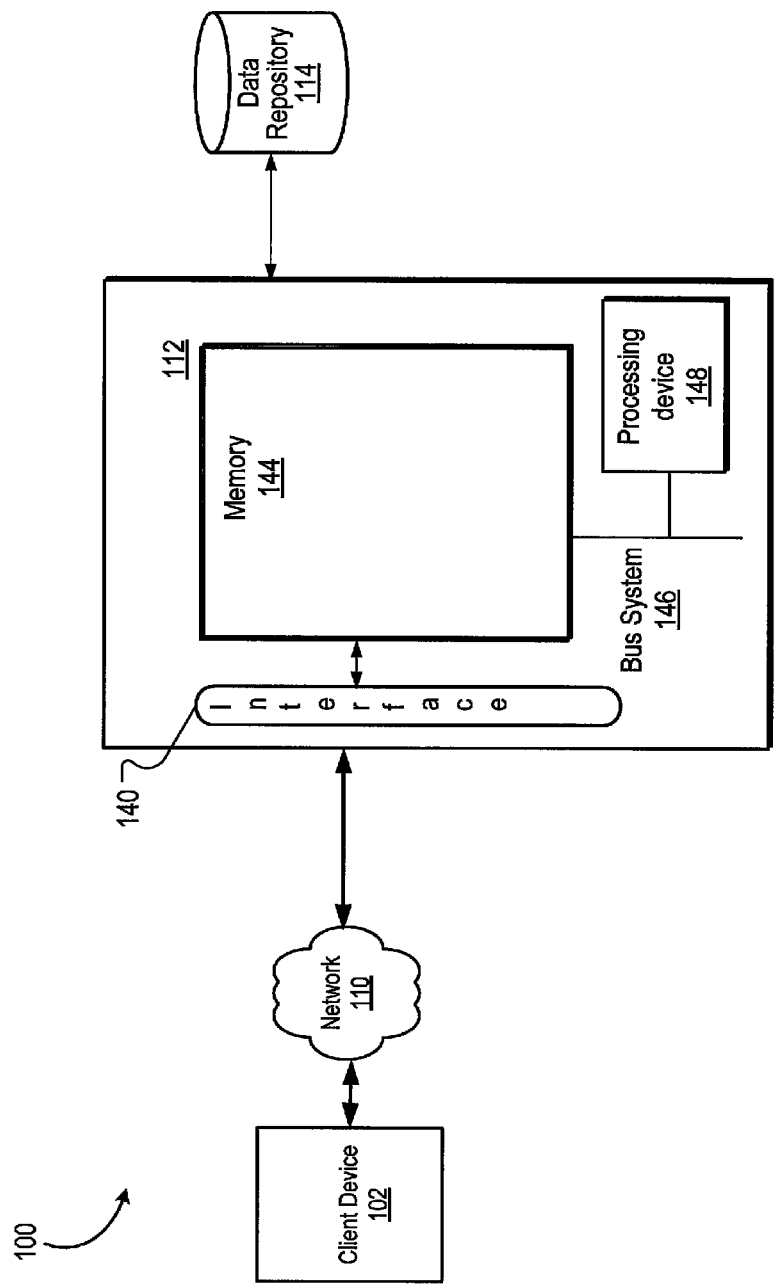
FIG. 2 is a block diagram of components of a system for real-time spend management.

Referring to FIG. 2, client device 102 can be any sort of computing devices capable of taking input from a user and communicating over network 110 with server 112 and/or with other client devices. For example, client device 102 can be mobile devices, desktop computers, laptops, cell phones, personal digital assistants ("PDAs"), iPhone, smart phones, iPads, servers, embedded computing systems, and so forth.

Spend management system 112 also includes memory 144, a bus system 146, and a processor 148. Memory 144 can include a hard drive and a random access memory storage device, such as a dynamic random access memory, machine-readable media, machine-readable hardware storage devices, or other types of non-transitory machine-readable storage devices. A bus system 146, including, for example, a data bus and a motherboard, can be used to establish and to control data communication between the components of spend management system 112. Processor 148 may include one or more microprocessors and/or processing devices. Generally, processor 148 may include any appropriate processor and/or logic that is capable of receiving and storing data, and of communicating over a network (not shown).

Spend management system 112 can be any of a variety of computing devices capable of receiving data, such as a server, a distributed computing system, a desktop computer, a laptop, a cell phone, a rack-mounted server, cloud computing device, and so forth. Spend management system 112 may be a single server or a group of servers that are at a same location or at different locations. Spend management system 112 can receive data from client devices 102 via input/output ("I/O") interface 140. I/O interface 140 can be any type of interface capable of receiving data over a network, such as an Ethernet interface, a wireless networking interface, a fiber-optic networking interface, a modem, and so forth.

Figure 3:
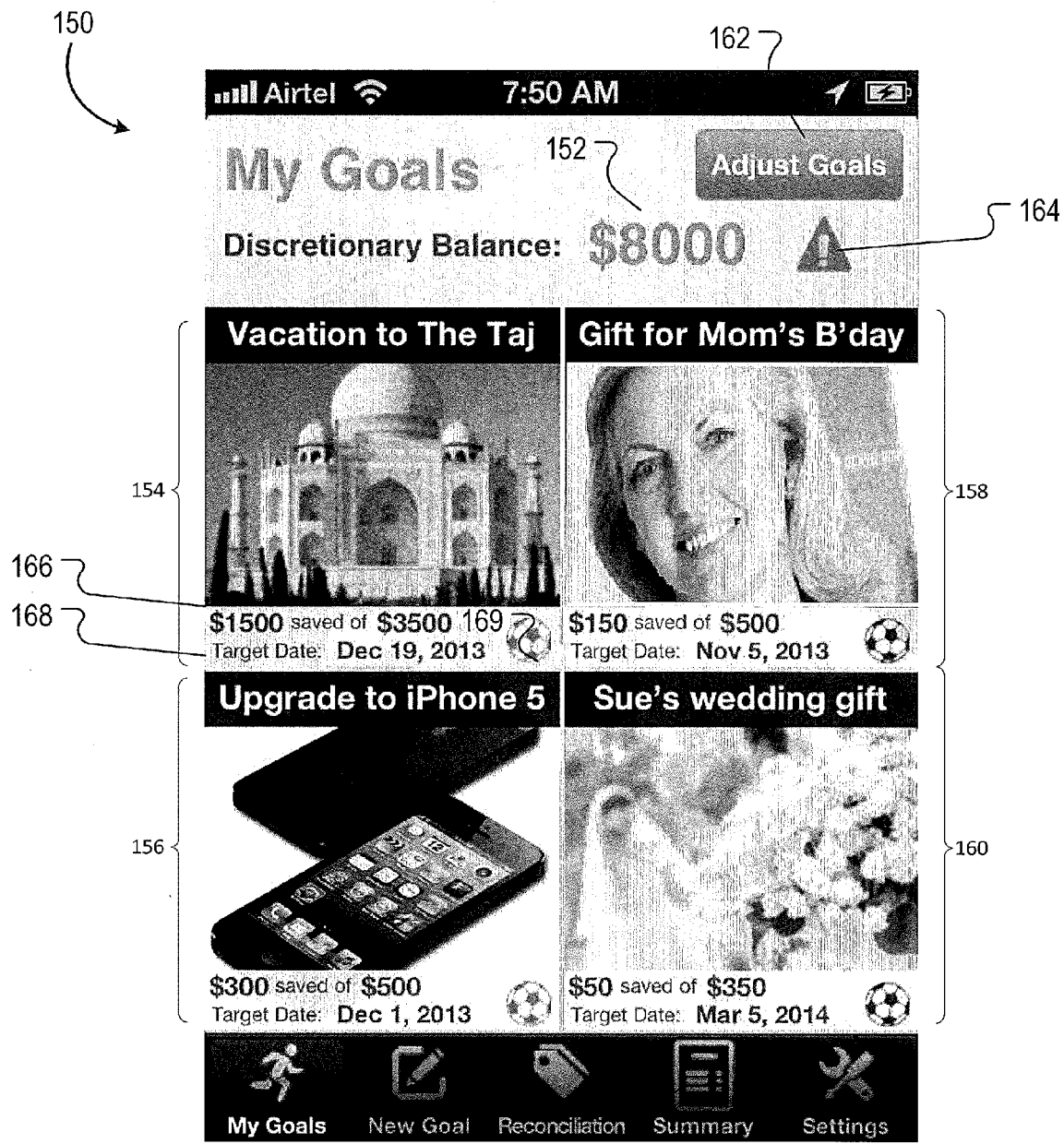
FIGS. 3-8 depict graphical user interfaces that are generated by the system for real-time spend management.

Referring now to FIG. 3, spend management system 112 generates information for graphical user interface 150, e.g., that is displayed on client device 102. Graphical user interface 150 displays discretionary balance information 152, e.g., information specifying an amount of discretionary balance in one or more financial accounts of a user of spend management system 112. Graphical user interface 150 includes control 162, selection of which enables a user to adjust savings goals. Graphical user interface 150 also includes alert 164 to notify a user that the current savings goals, time frames for completion of the savings goals and/or amounts of funds that are allocated to savings goals need adjustment, e.g., for the user to reach the specified savings goals within the time frames that the user specified.

Graphical user interface 150 includes savings goal portions 154, 156, 158, 160 for displaying information about various savings goals. Savings goal portion 154 includes savings information 166, e.g., information specifying an amount of funds that is allocated to the savings goal and an amount of funds required to complete the savings goal. Savings goal portion 154 also includes target date information 168, including, e.g., information specifying a target date for completion of the savings goal. Savings goal portion 154 also includes icon 169 to signify whether a user is on track to meet the savings goal. Icon 169 can be various colors, including, e.g., green and red. When icon 169 is green, this signifies that the user is on track to completing a savings goal (e.g., the user is allocating enough funds at predetermined time intervals to reach the savings goal and the target completion date). When icon 169 is red, this signifies that the user needs to re-adjust either a target completion date or allocated savings amount to meet a savings goal.

Figure 4:
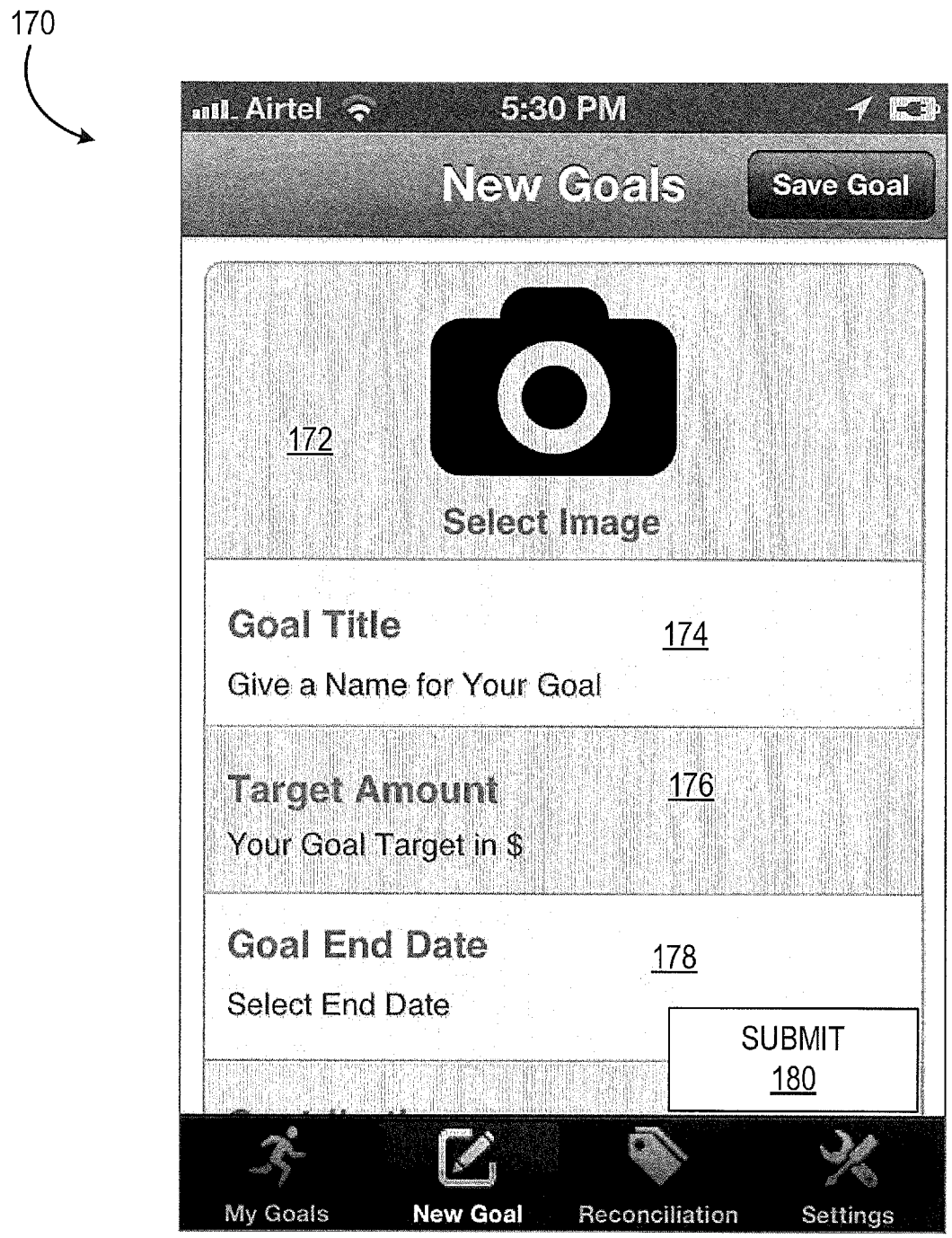

Referring to FIG. 4, spend management system 112 generates information for graphical user interface 170 to enable a user to generate a new savings goal. Graphical user interface 170 includes portion 172 for selection (e.g., from a mobile or wearable device using its camera, browser, image gallery or other image options available on device) of an image to represent the savings goal. Graphical user interface 170 also includes portion 174 for entry of a title of the savings goal. Graphical user interface 170 includes portion 176 for entry of a target amount, e.g., an amount of funds to be allocated to the savings goal. Graphical user interface 170 includes portion 178 for entry of information indicative of a goal end date. Graphical user interface 170 also includes submit control 180, selection of which causes the information entered into portions 172, 174, 176, 178 to be transmitted from the client device displaying graphical user interface 170 to spend management system 112. In response, spend management system 112 stores this transmitted information in data repository 114, e.g., as savings goal information 120 (FIG. 1).

Spend management system 112 uses recurring income and expenses in determining a discretionary balance during a predetermined time period, as shown in the below Table 5:

TABLE 5

Discretionary Balance$_{Pre-determined\ date}$ =
Available Balance$_{Transaction\ Date}$ +
Income$_{Pre-determined\ date}$ −
Expenses$_{Pre-determined\ date}$ −
Goal Allocated Funds As shown in the above Table 5, spend management system 112 determines a discretionary balance as of a pre-determined date. The pre-determined date is a specified future date, including, e.g., at the end of the month, weekly, and so forth. The pre-determined date may differ from the date on which spend management system 112 determines the discretionary balance. For example, if a user initiates a transaction on June 15, spend management system 112 may determine the discretionary balance of month end (e.g., June 30), rather than determining the discretionary balance as of the date that the transaction is initiated (e.g., June 15). By determining the discretionary balance as of month end, spend management system 112 accounts for income and expenses that have not yet been received/debited (as of the date the transaction is initiated) but will be received/debited by the month's end. As shown in the above Table 5, spend management system 112 determines the discretionary balance as of a pre-determined date (e.g., month's end) based on a current available balance on the transaction date, income as of the pre-determined date, expenses as of the pre-determined date and an amount of goal allocated funds.

Referring to the below Table 6, a user initiates a transaction on June 15 for an amount of $1500.

TABLE 6

| Available Balance (As of June 15) | Income (To be Credited June 27) | Expense (To be Debited June 30) | Goal Allocated Funds | Discretionary Transaction amount (June 15) |
|---|---|---|---|---|
| $3000 | $2000/month | $4000/month | $500/month | $1500 |

As shown in the above Table 6, the available balance as of June 15 in one or more financial accounts of the user is $3000, the financial accounts are credited with $2000 on June 27 and are debited $4000 for expenses on June 30, and the amount of goal allocated funds is $500/month. If spend management system 112 determines the discretionary balance as of June 15 (without taking into account income and expenses that are to be credited/debited later on in the month), spend management system 115 determines that the discretionary balance is $2500 (e.g., available balance−goal allocated funds=$3000−$500=$2500). A discretionary balance of $2500 is sufficient to cover the amount of the discretionary transaction (e.g., an amount of $1500).

If spend management system 112 allows the processing of the discretionary transaction, the user will have insufficient funds to cover the expenses of $4000/month that are debited at the end of the month (e.g., June 30). If spend management system 112 allows the processing of the discretionary transaction, the available balance drops to $1500. On June 27, the financial accounts are credited $2000 with the user's income, which raises the available balance to $3500. On June 30, when the user pays expenses, the $3500 available balance is insufficient to cover the $4000 of expenses.

In a variation, spend management system 112 uses the pre-determined (e.g., re-occurring) expenses and income in determining the discretionary balance. When the user initiates the discretionary transaction on June 15, spend management system 112 determines the discretionary balance as of a predetermined date (e.g., June 30 or the month's end) to use the expected expenses and income that may occur during a predetermined period of time (e.g., a month) in computing the discretionary balance. Spend management system 112 determines a discretionary balance of $500 for the month's end (e.g., June 30), as shown in the below Table 7:

TABLE 7

Discretionary Balance$_{June\ 30}$ ($500) =
Available Balance$_{Transaction\ Date}$ ($3000) +
Income$_{June\ 30}$ ($2000) −
Expenses$_{June\ 30}$ ($4000) −
Goal Allocated Funds ($500)

As shown in Table 7, the discretionary balance of $500 is less than the discretionary transaction amount of $1500 and thus insufficient to cover the discretionary transaction. Spend management system 112 causes a cancellation of the discretionary transaction and notifies the user of the insufficient discretionary balance.

Figure 5:

Referring now to FIG. 5, graphical user interface 210 includes notification message 212 to notify a user that a discretionary balance is insufficient to cover a discretionary purchase. Notification message 212 includes control 214, selection of which displays another graphical user interface for adjustments of savings goals to increase an amount of funds that are available for the discretionary balance.

Figure 6:

Referring to FIG. 6, spend management system 112 generates information for graphical user interface 220, which is rendered on a client device. Graphical user interface 220 includes savings goals portions 222, 224 for display of information indicative of savings goals. Graphical user interface 220 also includes portion 232 for display of information indicative of an amount of funds to be freed up or released from the savings goals, e.g., to increase an amount of the discretionary balance. Portion 232 specifies that $200 need to be freed up from savings goals.

Graphical user interface 220 includes portion 234 for display of information indicative of an amount of funds that have already been released from the various savings goals. Portion 234 specifies that $0 have been freed from the savings goals. Graphical user interface 220 includes control 226, selection of which specifies that the amount of funds to be released (as specified in portion 232) is to be equal split among the savings goals specified in savings goals portions 222, 224. If the user selects control 226, $100 is released from the amount saved for the savings goal specified by saving goal portion 222 and another $100 is released from the amount saved for the savings goal specified by saving goal portion 224.

Graphical user interface 220 includes control 228 for weighting an amount of savings that are released from the various savings goals. If the user selects control 228, a portion (e.g., 75%) of the total savings to be released that are released from one savings goal (e.g., the savings goal specified in savings goal portion 222) and another portion (e.g., 25%) of the total savings to be released from another savings goal (e.g., the savings goal specified in savings goal portion 224) based on the total amount blocked in each goal. Additional rules could be setup for quick reallocation of funds blocked towards savings goals back into discretionary balance at the point of sale.

Graphical user interface 220 also includes control 230 to specify a priority (e.g., an order) in which savings are released from the various savings goals. Following selection of control 230, a user specifies that savings are first released from the savings goal specified by savings goal portion 222. When the released savings are less than the total amount of savings to be released, the user may specify a second priority savings goal from which savings are released, a third priority savings goal from which savings are released, and so forth, until the savings released equals the total amount of savings to be released.

Graphical user interface 220 includes start date portion 242 to specify a start date of the savings goal. Graphical user interface 220 includes end date portion 244 to specify an end date of the savings goal. Graphical user interface 220 includes adjustment controls 236, 238, 240. Selection of adjustment control 236 decreases an amount of funds that are saved for the savings goal specified in savings goal portion 222. Selection of adjustment control 236 also increases the amount of time required to complete the savings goals. Selection of adjustment control 238 increases an amount of funds that are saved for the savings goal specified in savings goal portion 222. Selection of adjustment control 236 also decreases the amount of time required to complete the savings goals. Adjustment control 240 includes a slide control 241 that when moved to the left decreases an amount of funds that are saved for the savings goal specified in savings goal portion 222. When moved to the right, slide control 241 increases an amount of funds that are saved for the savings goal specified in savings goal portion 222. In an example, the user moves slide control 241 to the left to decrease an amount of funds that are saved and to free up funds for the discretionary balance.

Figure 7:

Referring to FIG. 7, graphical user interface 250 is an updated version of graphical user interface 220, e.g., after the user slides slide control 241 to the left. Slide control 241 has been moved to the left to release $200 from the amount of saved funds. Graphical user interface 250 includes portion 252, which is an update to portion 234 (FIG. 6) that specifies that $200 of funds that were previously allocated to a savings goal are released. Graphical user interface 250 also includes end date portion 254, which is an update to end date portion 244. End date portion 254 specifies that the completion date for the savings goal is extended by one month (e.g., from Dec. 19, 2013 to Jan. 19, 2014), e.g., on account of the release of the funds that were allocated to the savings goal.

Figure 8:
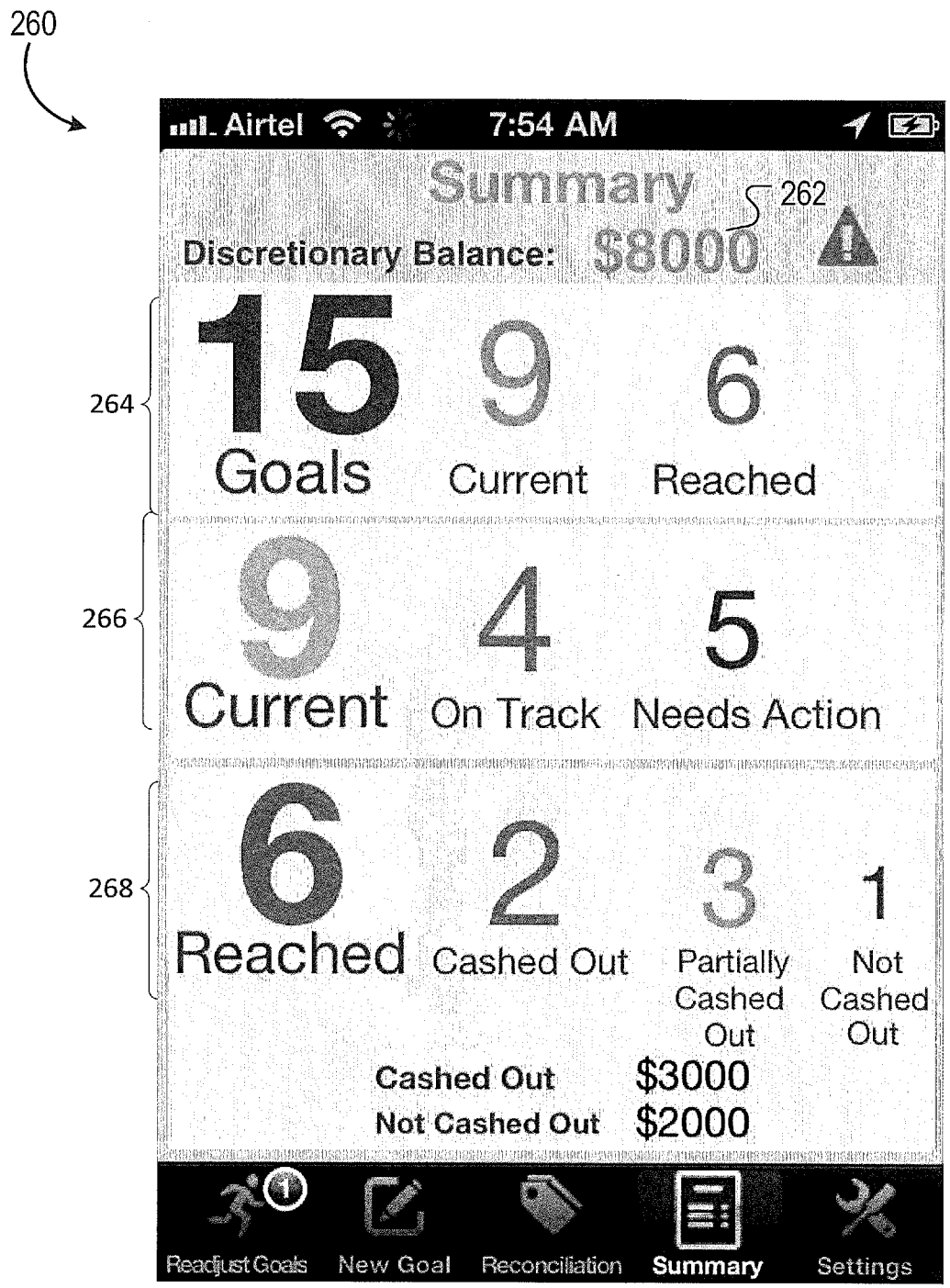

Referring to FIG. 8, graphical user interface 260 displays a summary of a user's savings goals. Graphical user interface 260 includes portion 262 for display of information indicative of a discretion balance. Graphical user interface 260 includes summary portion 264 for display of total goal information (e.g., information specifying a total number of goals for the user, which in this example is fifteen), information specifying a number of current goals (e.g., goals for which the savings target has not been reached), and reached goals (e.g., goals for which the savings target is reached).

Graphical user interface 260 also includes current goal portion 266 for display of information pertaining to the current goals. Current goal portion 266 displays information indicative of a number of savings goals that are "on-track," e.g., the user is allocating an appropriate amount of savings to the savings goal (e.g., at predetermined time intervals) to reach the savings goal at a specified completion date. Current goal portion 266 also displays information indicative of a number of savings goals for which action needs to take place, e.g., an insufficient amount of funds are being allocated to the savings goal (e.g., at predetermined time intervals) to reach the savings goal at a specified completion date and the user needs to take an action of either increasing the amount of funds being allocated to the savings goal or extending the target completion date.

Graphical user interface 260 also displays reached goal portion 268 for display of information indicative of reached goals. Reached goal portion 268 includes information indicative of cashed out goals, e.g., savings goals for which the user has withdrawn from financial accounts the funds that are allocated to the savings goal. Reached goal portion 268 includes information indicative of partially cashed out goals, e.g., savings goals for which the user has withdrawn from financial accounts a portion of the funds that are allocated to the savings goal. Reached goal portion 268 includes information indicative of non-cashed out goals, e.g., savings goals for which the user has not withdrawn from financial accounts the funds that are allocated to the savings goal.

Figure 9:
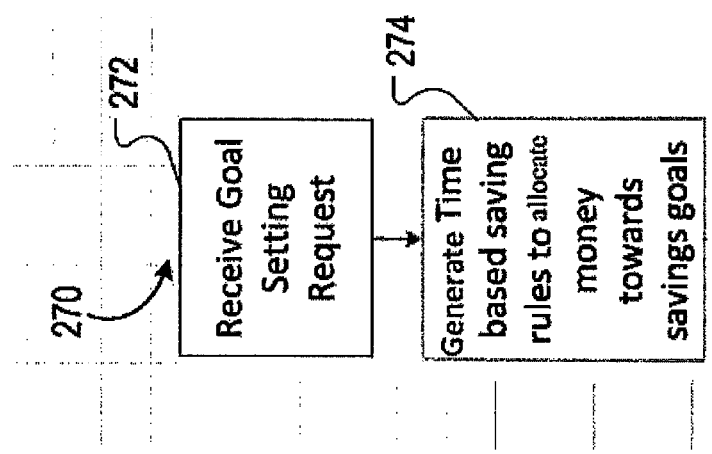
FIGS. 9 and 10 are flow charts of processes executed by a system for real-time spend management.

Referring to FIG. 9, spend management system 112 implements process 270 in allocating funds for savings goals. In operation, spend management system 112 receives (272), e.g., from a client device, a goal setting request. Generally, a goal setting request includes information indicative of a goal, a name of the goal, an amount of funds to be saved to reach the goal, account information specifying one or more account numbers of financial accounts from which funds are allocated for the savings goals, and a target date for completion of the goal. Using contents of the goal setting request, spend management system 112 generates (274) time based savings rules to allocate funds towards the savings goals. Generally, a time based savings rule includes an instruction to allocate (e.g., evenly) a specified amount of funds to a savings goal at specified time intervals, based on the amount of funds to be saved and based on the completion date for the savings goal. For example, if a savings goal requires $3000 in funds and has a target completion date of three months, spend management system 112 generates a time based savings rules to allocation $1000 every month to the savings goal, e.g., to promote completion of the savings goal within three months. The time based savings rules are saved in data repository 114.

Figure 10:
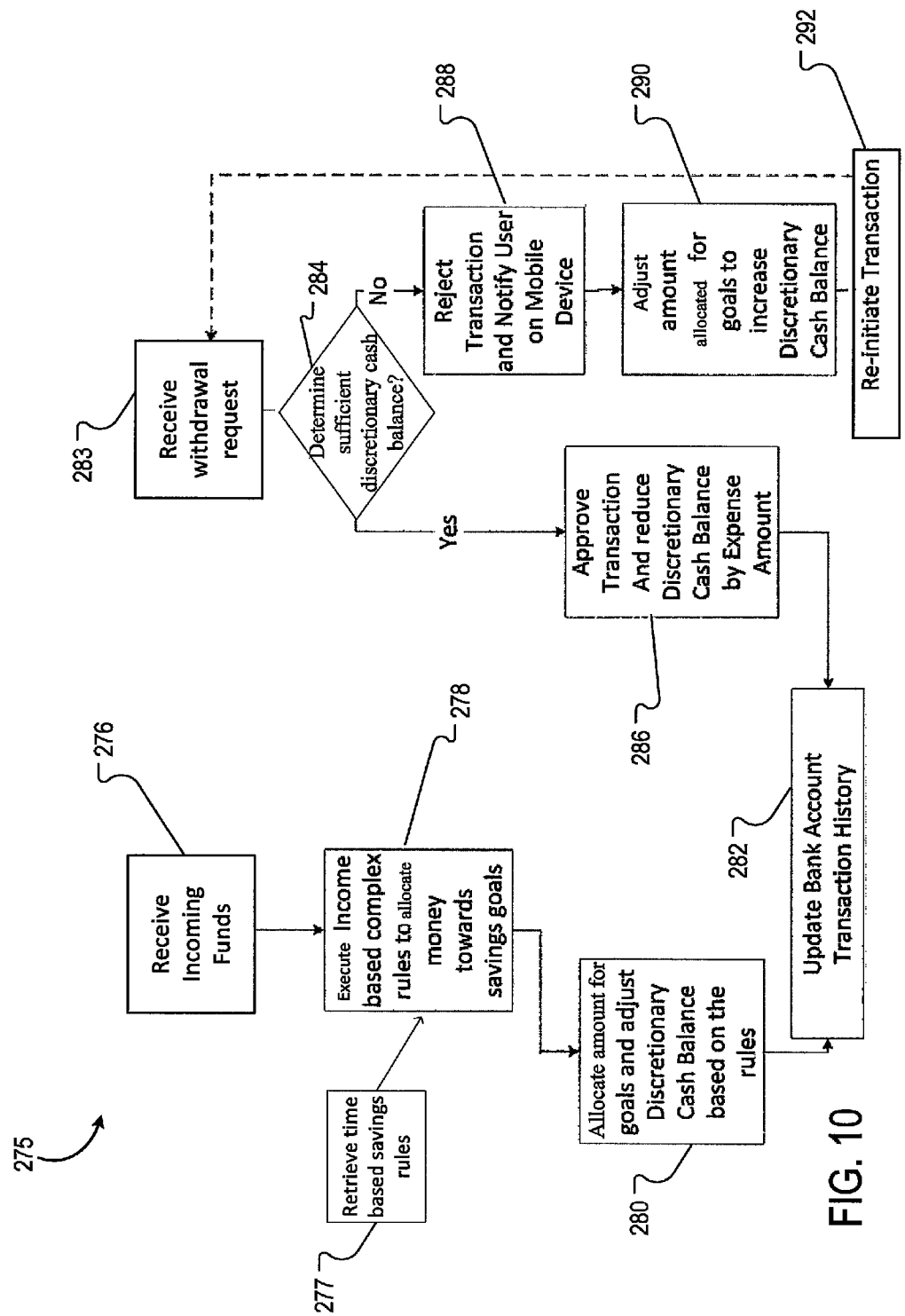

Referring to FIG. 10, spend management system 112 executes process 275 in determining whether a discretionary balance is sufficient to cover an amount of a discretionary transaction. Spend management system 112 receives (276) incoming funds to be deposited into the one or more financial accounts. These incoming funds include automatic deposits. Spend management system 112 retrieves (277), from data repository 114, the time based savings rules. Using the time based savings rules, spend management system 112 determines a time-distributed allocation amount for savings goal, i.e., an amount of funds that need to be allocated to a savings goal at evenly distributed time intervals (e.g., monthly) to reach the savings goal by the target completion date.

Spend management system 112 retrieves from data repository 114 and executes (278) income based rules to allocate money towards the savings goals. Generally, an income based rule includes an instruction to allocate a portion of incoming funds to savings goals, e.g., as specified in the below Table 8:

TABLE 8

Income Based Rule

If available balance > $2000, allocate X %
of income to savings goal I and Y % of
income to savings goal II As shown in Table 8, an income based rule may be based on a current available balance. In the above income based rule, when the current available balance of the financial accounts is greater than $2000, the income based rule specifies that a specified amount (e.g., X %) of the income is allocated to a first savings goal and another specified amount (e.g., Y %) is allocated to another, second savings goal. Spend management system 112 determines values for the specified amounts (e.g., X % and Y %) based on time-distributed allocation amounts (or a portion thereof) for various savings goals. In another example, the income based rule specifies that a portion of income that is allocated to a savings goal is equal to the time-distributed savings allocation. For example, if the time-distributed savings allocation for a first savings goal is $200/month and the time-distributed savings allocation for a second savings goal is $300/month, then spend management system 112 allocates $200 of income to the first savings goal and $300 of income to the second savings goal, independent of the available balance.

Spend management system 112 allocates (280) funds to savings goals, in accordance with the time based savings rules and the income based savings rules. Using the income based rules, spend management system 112 determines what portion of income is allocated to achieve the time-distributed allocation amount for a particular savings goal. If the time-distributed allocation amount for the particular savings goal is partially covered by incoming funds, spend management system 112 may implement various actions. In an example, spend management system 112 allocates additional funds that are currently in the financial accounts (as specified by the available balance) to meet the amount of funds required for the time-distributed allocation amount. In still another example, spend management system 112 notifies the user that the incoming funds are insufficient to cover the savings goal and that the user needs to either cancel the savings goal or reduce an amount of the savings goal.

Based on the determined time-distributed allocation amounts, spend management system 112 determines a discretionary balance. Spend management system 112 updates (282) a bank account transaction history for the user, e.g., to reflect that funds have been allocated for a particular savings goal.

Spend management system 112 also receives (282$) a withdrawal request, including, e.g., a request to withdraw funds from one or more financial accounts for a discretionary transaction. The discretionary transaction includes a transaction for a good or a service that is not a recurring expense. Spend management system 112 determines (284) whether the discretionary balance is sufficient to cover an amount of the discretionary transaction, e.g., whether the discretionary balance is greater than or equal to an amount of the discretionary transaction. Spend management system 112 determines in real-time whether the discretionary balance is sufficient to cover an amount of the discretionary transaction, e.g., based on real-time updates to income that is credited to financial accounts and expenses that are debited from the financial accounts.

When the discretionary balance is sufficient to cover the amount of the discretionary transaction, spend management system 112 approves (286) the discretionary transaction by allocating funds from the discretionary balance for the transaction and causing a notification of available funds to be sent to a credit card processing network (or other card network). Spend management system 112 reduces the discretionary balance by the amount of the discretionary transaction. Spend management system 112 updates the bank account transaction history with information indicative of debiting of the financial accounts for the amount of the discretionary transaction.

The discretionary balance is insufficient to cover the discretionary transaction, when the discretionary balance is less than the amount of the discretionary transaction. When the discretionary balance is insufficient to cover the discretionary transaction, spend management system 112 denies (288) the discretionary transaction and notifies the user of the rejection. For example, the spend management system 112 can send a notification to the user that the discretionary balance is insufficient or in some examples, the spend management system 112 can deny the transaction and cause a notification to be sent to a credit card processing network (or other card network) that the transaction is denied.

Based on information received from the user, spend management system 112 adjusts (290) the amount of funds that are allocated to the savings goals to increase the discretionary balance, e.g., relative to an amount of the discretionary balance prior to the adjustment. Spend management system 112 re-initiates (292) the transaction, e.g., by sending to the processing network a request to re-initiate the transaction and/or by prompting the user to re-initiate the transaction by re-swiping a credit card or a debit card. Spend management system 112 repeats actions 282, 284, 288, 290, 292, until an amount of funds that were previously allocated to savings goals are released to cover an amount of the discretionary transaction.

Real-time spend management that is implemented through spend management system 112 may be either voluntary or involuntary. When real-time spend management is voluntary, a user voluntarily enrolls in real-time spend management through spend management system 112. In this example, the user may download an application onto the user's client device, with the application interfacing with spend management system 112. Through the application, the user receives alerts and notifications when a discretionary balance is insufficient to cover an amount of a discretionary transaction. The user has the option of bypassing the alert/notification and proceeding with the discretionary transaction, even though the discretionary balance is less than the amount of the discretionary transaction. The user bypasses the alert by not asking the merchant (at whose place of business the discretionary transaction occurs) to cancel the transaction and/or by not performing any actions and allowing the discretionary transaction to be processed. In this example of voluntary real-time spend management, the spend management system 112 notifies the user when the discretionary balance is insufficient to cover the discretionary transaction but does not deny or otherwise cause a cancellation of the discretionary transaction.

When real-time spend management is involuntary, a user is required to participate in real time spend management through spend management system 112, e.g., by a court decree, a judicial decree, and so forth. For example, if a user applies for bankruptcy protection, a court may decree that prior to granting bankruptcy protection that the user is mandated to enroll in the real-time spend management. For involuntary real-time spend management, the user may download an application onto the user's client device, with the application interfacing with spend management system 112. Through the application, the user receives alerts and notifications when a discretionary balance is insufficient to cover an amount of a discretionary transaction. The user does not have the option of bypassing the alert/notification and proceeding with the discretionary transaction. When the discretionary balance is insufficient to cover a discretionary transaction, spend management system 112 causes the discretionary transaction to be denied and not processed, e.g., by sending to a payment processing network such as a credit card processing network information specifying that the discretionary transaction should be denied and not proceed by the payment processing network.

Spend management system 112 determines whether a discretionary balance is sufficient to cover discretionary transactions and not pre-set up bill payments, pre-specified debits or other transactions that the user has previously specified.

Spend management system 112 is configured for real-time integration with an electronic calendar, e.g., that is on a mobile device of a user. For example, a client device of a user includes an application for an electronic calendar. The electronic calendar tracks various scheduled events (e.g., dinners and meetings) and important events of the user (e.g., birthdays). In this example, the client device downloads a real-time spend management application from spend management system 112. The real-time spend management application interfaces with the electronic calendar and with spend management system 112. Through the interface between the electronic calendar and the real-time spend management application, the electronic calendar transmits to the real-time spend management application event information indicative of an event or a notification on the calendar, e.g., a birthday or a scheduled dinner. In response to receipt of the event information, real-time spend management application requests from spend management system 112 information indicative of a discretionary balance of the user. Spend management system 112 transmits to the real-time spend management application information indicative of the discretionary balance. The real-time spend management application generates a notification that is displayed on the client device that informs the user of the amount of discretionary balance that is available for the scheduled calendar event, e.g., an amount of discretionary balance that is available to spend on the lunch or on the dinner, and an opportunity to switch off discretionary balance check for the duration of the scheduled calendar event. It can also generate notification that is displayed on the client device that informs the user of the upcoming events like birthdays or anniversaries coming up within specified time period for which user may wish to create new savings goal or may choose to discard that notification.

In a variation, the real-time spend management application transmits to the electronic calendar application information indicative of the discretionary balance. In this example, the electronic calendar notifies the user of the amount of the discretionary balance that is available to spend on a scheduled event. In another example, the electronic calendar inserts into the event notification information indicative of the amount of the discretionary balance.

The real-time spend management application (on a client device such as a mobile device) interfaces with a global positioning system (GPS) application on the client device. Through the GPS system, the real-time spend management application received geographic information (e.g., information indicative of latitude and longitude coordinates) of the user. The real-time spend management application transmits the geographic information to spend management system 112.

Using the received geographic location information, spend management system 112 determines whether the user is at or in proximity to a designated alert location, e.g., a location that has been pre-determined as a location in which a user is likely to initiate discretionary transactions. Spend management system is pre-programmed with various alert locations. A user may also specify, via the real-time spend management application, which types of locations are alert locations for the user. There are various types of designated alert locations, including, e.g., restaurants, malls, amusement parks, and so forth.

When spend management system 112 detects that the user is at or in proximity to (e.g., with a predefined distance) of an alert location and remains in the proximity for certain amount of time, spend management system 112 notifies the user (via the real-time spend management application) of the discretionary balance across the one or more financial accounts of the user, e.g., to decrease an amount of impulse spending (relative to an amount of impulse spending without real-time spend management) and to promote savings and achievement of the savings goals.

The spend management system will also enable user to share savings goals to additional people for view or contribution through through social media and other internet mechanisms.

Embodiments can be implemented in digital electronic circuitry, or in computer hardware, firmware, software, or in combinations thereof. Apparatus can be implemented in a computer program product tangibly embodied or stored in a machine-readable storage device for execution by a programmable processor; and method actions can be performed by a programmable processor executing a program of instructions to perform functions by operating on input data and generating output. The techniques described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD_ROM disks. Any of the foregoing can be supplemented by, or incorporated in, ASICs (application-specific integrated circuits).

Other embodiments are within the scope and spirit of the description and the claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments have been described. Nevertheless, it will be understood that various modifications may be made without departing from the spirit and scope of the claims and the examples of the techniques described herein.

What is claimed is:

1. A computer-implemented method, comprising:
   receiving, by one or more computer systems, a goal setting request that specifies a savings goal, with the goal setting request specifying an amount of funds to be saved in satisfaction of the savings goal by a completion date;
   in response to the goal setting request, generating a time-based savings rule to allocate funds towards the savings goal, with the time-based savings rule specifying an amount of funds to be allocated to the savings goal at specified time intervals, based on the amount of funds to be saved and based on the completion date for the savings goal;
   receiving, by one or more computer systems, a withdrawal request for withdrawal of funds from one or more financial accounts;
   automatically subtracting, in response to the withdrawal request, by execution of the time-based savings rule by the one or more computer systems, funds allocated to the savings goal from an amount of funds that are available in the one or more financial accounts, with the funds allocated to the savings goal differing from the withdrawal request;

following subtraction of the funds allocated to the savings goal, determining, by the one or more computer systems, a remaining balance of the one or more financial accounts, with the remaining balance being an amount of funds that remain in the one or more financial accounts after subtracting the funds allocated to the savings goal from the amount of funds available in the one or more financial accounts;

determining in real-time by the one or more computer systems, whether the remaining balance of the one or more financial accounts is greater than or equal to an amount of the withdrawal request;

generating a real-time notification when the remaining is less than the amount of the withdrawal request; and sending, over the Internet to an application on a client device, a real-time notification to cause the application to display an alert to adjust the savings goal to a level at which the remaining balance is greater than or equal to the amount of the withdrawal request.

2. The computer-implemented method of claim 1, further comprising:

causing an approval of the withdrawal request when the remaining balance is greater than or equal to the amount of the withdrawal request.

3. The computer-implemented method of claim 1, wherein the real-time notification is a notification of an insufficient remaining balance for the withdrawal request.

4. The computer-implemented method of claim 1, wherein determining the remaining balance comprises:

determining the remaining balance as of a future date and as of a current date, with the remaining balance for the future date being based on an available balance on a date of the withdrawal request, an amount of income that is expected to be credited to the one or more financial accounts by the future date, an amount for expenses that is expected to be debited from the one or more financial accounts by the future date and the funds that are allocated to the savings goal and with the remaining balance as of the current date being based on available balance less the funds allocated to savings goal.

5. The computer-implemented method of claim 1, further comprising:

receiving, from the client device associated with the user, information requesting approval of the withdrawal request when the remaining balance is less than the amount of the withdrawal request; and causing an approval of the withdrawal request, when the available funds are greater than or equal to the amount of the withdrawal request.

6. The computer-implemented method of claim 1, further comprising:

reducing the amount of the remaining balance by the amount of the withdrawal request when the remaining balance is greater than or equal to the amount of the withdrawal request.

7. The computer-implemented method of claim 1, further comprising:

receiving, from the client device associated with the user, information indicative of an adjustment of the funds that are allocated to the savings goal, with the adjustment increasing an amount of remaining balance, relative to the amount of remaining balance prior to the adjustment when the remaining balance is less than the amount of the withdrawal request; and causing an approval of the withdrawal request.

8. The computer-implemented method of claim 1, further comprising:

retrieving incoming fund information indicative of an amount of incoming funds that are expected to be deposited into the one or more financial accounts at one or more predetermined time intervals;

allocating, by the one or more computing systems based on the savings goal information and a current balance of the one or more financial accounts, an amount of the incoming funds to the savings goal; and wherein subtracting comprises: at one of the one or more predetermined time intervals, reducing a balance of the one or more accounts by the amount of funds allocated to the savings goal.

9. A computer program product tangibly stored on a computer readable hardware storage device, the computer program product comprising instructions for causing one or more processing devices to:

receive a goal setting request that specifies a savings goal, with the goal setting request specifying an amount of funds to be saved in satisfaction of the savings goal by a completion date;

generate, in response to the goal setting request, a time-based savings rule to allocate funds towards the savings goal, with the time-based savings rule specifying an amount of funds to be allocated to the savings goal at specified time intervals, based on the amount of funds to be saved and based on the completion date for the savings goal;

receive a withdrawal request for withdrawal of funds from one or more financial accounts;

automatically subtract in response to the withdrawal request, by execution of the time-based savings rule, funds allocated to the savings goal from an amount of funds that are available in the one or more financial accounts;

determine a remaining balance of the one or more financial accounts, with the remaining balance being an amount of funds that remain in the one or more financial accounts after subtracting the funds allocated to the savings goal from the amount of funds available in the one or more financial accounts;

determine in real-time, whether the remaining balance of the one or more financial accounts is greater than or equal to an amount of the withdrawal request;

cause an approval of the withdrawal request when the remaining balance is greater than or equal to the amount of the withdrawal request;

generate a real-time notification when the remaining balance is less than the amount of the withdrawal request; and send, over the Internet to an application on a client device, the real-time notification that causes the application to display an alert to adjust the savings goal to a level at which the remaining balance is greater than or equal to the amount of the withdrawal request.

10. The computer program product of claim 9, wherein the computer program product further comprises instructions for causing the one or more processing devices to cause an approval of the withdrawal request when the remaining balance is greater than or equal to the amount of the withdrawal request.

11. The computer program product of claim 9, wherein the real-time notification is a notification of an insufficient remaining balance for the withdrawal request.

12. The computer program product of claim 9, wherein determining the remaining balance comprises:

determining the remaining balance as of a future date and as of a current date, with the remaining balance for the future date being based on an available balance on a date of the withdrawal request, an amount of income that is expected to be credited to the one or more financial accounts by the future date, an amount for expenses that is expected to be debited from the one or more financial accounts by the future date and the funds that are allocated to the savings goal and with the remaining balance as of the current date being based on available balance less the funds allocated to savings goal.

13. The computer program product of claim 9, further comprising instructions for causing the one or more processing devices to:
receive, from the client device associated with the user, information requesting approval of the withdrawal request when the remaining balance is less than the amount of the withdrawal request; and
cause an approval of the withdrawal request, when the available funds are greater than or equal to the amount of the withdrawal request.

14. The computer program product of claim 9, further comprising instructions for causing the one or more processing devices to:
reduce the amount of the remaining balance by the amount of the withdrawal request when the remaining balance is greater than or equal to the amount of the withdrawal request.

15. The computer program product of claim 9, further comprising instructions for causing the one or more processing devices to:
receive, from the client device associated with the user, information indicative of an adjustment of the funds that are allocated to the savings goal, with the adjustment increasing an amount of remaining balance, relative to the amount of remaining balance prior to the adjustment when the remaining balance is less than the amount of the withdrawal request; and
cause an approval of the withdrawal request.

16. The computer program product of claim 9, further comprising instructions for causing the one or more processing devices to:
retrieve incoming fund information indicative of an amount of incoming funds that are expected to be deposited into the one or more financial accounts at one or more predetermined time intervals;
allocate, based on the savings goal information and a current balance of the one or more financial accounts, an amount of the incoming funds to the savings goal; and
wherein instructions to subtract comprise: at one of the one or more predetermined time intervals, reduce a balance of the one or more accounts by the amount of funds.

17. A system comprising:
one or more processing devices; and
a computer program product tangibly stored on a computer readable hardware storage device, the computer program product comprising instructions for causing the one or more processing devices to:
receive a goal setting request that specifies a savings goal, with the goal setting request specifying an amount of funds to be saved in satisfaction of the savings goal by a completion date;
generate, in response to the goal setting request, a time-based savings rule to allocate funds towards the savings goal, with the time-based savings rule specifying an amount of funds to be allocated to the savings goal at specified time intervals, based on the amount of funds to be saved and based on the completion date for the savings goal;
receive a withdrawal request for withdrawal of funds from one or more financial accounts;
automatically subtract in response to the withdrawal request, by execution of the time-based savings rule, funds allocated to the savings goal from an amount of funds that are available in the one or more financial accounts;
determine a remaining balance of the one or more financial accounts, with the remaining balance being an amount of funds that remain in the one or more financial accounts after subtracting the funds allocated to the savings goal from the amount of funds available in the one or more financial accounts;
determine in real-time, whether the remaining balance of the one or more financial accounts is greater than or equal to an amount of the withdrawal request;
cause an approval of the withdrawal request when the remaining balance is greater than or equal to the amount of the withdrawal request
generate a real-time notification when the remaining balance is less than the amount of the withdrawal request; and
send, over the Internet to an application on a client device, the real-time notification that causes the application to display an alert to adjust the savings goal to a level at which the remaining balance is greater than or equal to the amount of the withdrawal request.

18. The system of claim 17, wherein the computer program product further comprises instructions for causing the one or more processing devices cause an approval of the withdrawal request when the remaining balance is greater than or equal to the amount of the withdrawal request.

19. The system of claim 17, wherein the real-time notification is a notification of an insufficient remaining balance for the withdrawal request.

20. The system of claim 17, wherein determining the remaining balance comprises:
determining the remaining balance as of a future date and as of a current date, with the remaining balance for the future date being based on an available balance on a date of the withdrawal request, an amount of income that is expected to be credited to the one or more financial accounts by the future date, an amount for expenses that is expected to be debited from the one or more financial accounts by the future date and the funds that are allocated to the savings goal and with the remaining balance as of the current date being based on available balance less the funds allocated to savings goal.

21. The system of claim 17, further comprising instructions for causing the one or more processing devices to:
receive, from the client device associated with the user, information requesting approval of the withdrawal request when the remaining balance is less than the amount of the withdrawal request; and
cause an approval of the withdrawal request, when the available funds are greater than or equal to the amount of the withdrawal request.

22. The system of claim 17, further comprising instructions for causing the one or more processing devices to:
reduce the amount of the remaining balance by the amount of the withdrawal request when a discretionary balance is greater than or equal to the amount of the withdrawal request.

23. The system of claim 17, further comprising instructions for causing the one or more processing devices to:
receive, from the client device associated with the user, information indicative of an adjustment of the funds that are allocated to the savings goal, with the adjustment increasing an amount of remaining balance, relative to the amount of remaining balance prior to the adjustment when the remaining balance is less than the amount of the withdrawal request; and cause an approval of the withdrawal request.

24. The system of claim 17, further comprising instructions for causing the one or more processing devices to:

retrieve incoming fund information indicative of an amount of incoming funds that are expected to be deposited into the one or more financial accounts at one or more predetermined time intervals;

allocate, based on the savings goal information and a current balance of the one or more financial accounts, an amount of the incoming funds to the savings goal; and wherein instructions to subtract comprise: at one of the one or more predetermined time intervals, reduce a balance of the one or more accounts by the amount of funds.

\* \* \* \* \*